United States Patent
Jafar et al.

(10) Patent No.: US 12,189,670 B2
(45) Date of Patent: Jan. 7, 2025

(54) SYSTEMS AND METHODS FOR SYSTEMATIC LITERATURE REVIEW

(71) Applicant: Cytel Inc., Waltham, MA (US)

(72) Inventors: Reza Jafar, Vancouver (CA); Anna Forsythe, Miami, FL (US); Kristian Thorlund, Vancouver (CA); Junhan Liu, Toronto (CA)

(73) Assignee: Cytel Inc., Waltham, MA (US)

( * ) Notice: Subject to any disclaimer, the term of this patent is extended or adjusted under 35 U.S.C. 154(b) by 0 days.

(21) Appl. No.: 18/344,205

(22) Filed: Jun. 29, 2023

(65) Prior Publication Data
US 2024/0004910 A1    Jan. 4, 2024

Related U.S. Application Data

(60) Provisional application No. 63/367,277, filed on Jun. 29, 2022.

(51) Int. Cl.
*G06F 16/33* (2019.01)
*G06F 16/35* (2019.01)

(52) U.S. Cl.
CPC ...... *G06F 16/3346* (2019.01); *G06F 16/3334* (2019.01); *G06F 16/35* (2019.01)

(58) Field of Classification Search
CPC ... G06F 16/3346; G06F 16/35; G06F 16/3334
See application file for complete search history.

(56) References Cited

U.S. PATENT DOCUMENTS

| | | | |
|---|---|---|---|
| 8,799,236 B1 | 8/2014 | Azari et al. | |
| 11,080,483 B1 * | 8/2021 | Islam | G06F 16/35 |
| 11,328,796 B1 * | 5/2022 | Jain | G16H 10/20 |
| 2011/0010177 A1 | 1/2011 | Nakano et al. | |
| 2015/0358270 A1 | 12/2015 | Jacobs et al. | |
| 2017/0235848 A1 * | 8/2017 | Van Dusen | G06Q 10/101 705/12 |
| 2017/0344886 A1 * | 11/2017 | Tong | G06N 5/022 |
| 2018/0018355 A1 | 1/2018 | Toivanen et al. | |
| 2020/0401661 A1 * | 12/2020 | Kota | G06N 20/00 |
| 2021/0034812 A1 * | 2/2021 | Mezaoui | G06N 3/04 |
| 2021/0319907 A1 * | 10/2021 | Harley | G16H 50/70 |
| 2022/0100958 A1 * | 3/2022 | Kiazand | G06N 3/08 |
| 2022/0327356 A1 * | 10/2022 | Rossiello | G06N 5/025 |
| 2022/0375539 A1 * | 11/2022 | Alvarez | G16B 15/20 |

(Continued)

FOREIGN PATENT DOCUMENTS

| | | |
|---|---|---|
| WO | 2024006431 A1 | 1/2024 |

OTHER PUBLICATIONS

PCT/US2023/026569, "International Application Serial No. PCT/US2023/026569, International Search Report and Written Opinion mailed Sep. 29, 2023", Cytel Inc., 17 pages.

*Primary Examiner* — Eliyah S. Harper

(74) *Attorney, Agent, or Firm* — GTC Law Group PC & Affiliates

(57) ABSTRACT

Publication pre-screening may include the use of a trained model. A trained language model may be fine-tuned on a question-and-answer task and may be configured to receive a question that includes inclusion and exclusion criteria for a publication. The question may be formulated to include context information such as a title and abstract of the publication. An output of the model may be used to determine a selection of the publication.

17 Claims, 9 Drawing Sheets

(56) References Cited

U.S. PATENT DOCUMENTS

| | | | | |
|---|---|---|---|---|
| 2023/0377748 A1* | 11/2023 | Yang | .................... | G06N 3/08 |
| 2023/0377749 A1* | 11/2023 | Berisha | .................. | G10L 25/66 |
| 2024/0004910 A1* | 1/2024 | Jafar | .................. | G06F 16/3329 |

* cited by examiner

| | A | B | C | D | E |
|---|---|---|---|---|---|
| | | INCLUSION | INCLUSION KEYWORDS | EXCLUSION | EXCLUSION KEYWORDS |
| 1 | Patient Population | Patients with chronic Lymphoid leukemia | Chronic lymphoid leukemia; CLL; chronic lymphocytic Leukemia | Non-human; Not fulfilling inclusion criteria | animals; mice; Mice; mouse; Mouse; murine; Murine; rats; Rats; preclinical; in vivo; in vitro; ex vivo, xenograft; animal; cell line |
| 2 | Intervention and Comparators | All approved/ recommended interventions or in phase 1b-3 clinical trials: Ibrutinib; Acalabrutinib; Venetoclax (ABT-199); Bendamustine (Bendamustine hydronchloride); Rituximab; Fludarabine; Navitoclax; Cyclophosphamide; Pentostatin; Chlorambucil; Zanubrutinib; Lenalidomide; Tiselelizumab (BGB-A317); Nemtabrutinib; BGB-10188; Orelabrutinib (ICP-022); Forodesine (BCX-1777); Lenalidomide; Buarlisib; Tiselelizumab (BGB-A317); Navitoclax; Nemtabrutinib; BGB-10188; Orelabrutinib (ICP-022); Forodesine (BCX-1777); Lumiliximab; Relatlimab (BMS-986016); Nivolumab (BMS-936558; Opdivo); Epcoritamab; Durvalumab (IMFINZI); Pirtobrutinib (LOXO-305); Mosunetuzumab (RG7828); Oblimersom (G3139); Nenileukin diftitox (ONTAK); Milatuzumab; Veltuzumab; Tiraburtinib (Velexbru); Entospletinib (GS-9937); Umbralisib (TGR-1202; Ukoniq); Parsaclisib (IBI376); Tafasitamab (MOR208; Monjuvi); Alvocidib (Flavopiridol); Dacetuzumab (SGN-40); Belimumab (Benlysta); Cirmtuzumab (UC-961) | Lenalidomide; Tiselelizumab; BGB-A317; Navitoclax; Nemtabrutinib; BGB-10288; Orelabrutinib; ICP-022; Forodesine; BCX-1777; Lumiliximab; Relatlimab; BMS-986016; Nivolumab; BMS-936558; Opdivo; Buparlisib; Durvalumab; IMFINZI; Denileukin diftitox; ONTAK; Pirtobrutinib; LOXO-3055; Mosunetuzemab; RG7828; Epcoritamab; Oblimerson; G3139; Milatuzumab; Veltusumab; Tiraburtinib; Velexbru; Entospletinib; GS-9973; Nelarabine, Arranon; Pembrolisumab, Keytruda; Umbralisib; TGR-1202; Ukoniq; Tafasitamab; MOR208; Monjuvi; SGN-40; Parsaclisib; IBI376; Alcocidib, Benlysta; Flavopiridol; Dacetusumab; UC-961 Belimumab; Cirmtuzumab | Studies not including any interventions or interest | |
| 3 | Outcomes measures | Reporting efficacy; Response (CR/PR/ORR); Survival outcomes (PFS/OS) | efficacy; survival; Survival; Response; response; time to; duration of, overall survival, progression-free; progression free; OS; PR; DOR; duration of response; PFS; OS | Studies not including at least one of the outcomes listed in Inclusion Criteria | |
| 4 | Study design | All approved recommended or in Phase II or III randomized clinical trials including Systematic reviews and meta-analyses (in order to check the bibliography for relevant RCTs) | | Reviews/Editorials/Notes/ Comments/Letter; Real world evidence studies; Case reports; Case series; Non-RCTs | |
| 5 | Limitation | English language; 2015-current | | Non-English language studies; prior to 2015 | |

FIG. 4

| JOURNAL | VOLUME | ISSUE | PAGES | DUPLICATE GROUP # | PICOS | POPULATION PROBABILITY | INTERVENTION PROBABILITY | STUDY DESIGN PROBABILITY | SELECTION | REASON FOR REJECTION | COMMENT |
|---|---|---|---|---|---|---|---|---|---|---|---|
| Lung cancer (Amsterdam, Netherlands) | | | | 267 | Population: Patients with advance | 0 | 1 | 1 | NO | POPULATION | |
| Lung cancer (Amsterdam, Netherlands) | | | | 267 | Population: Patients with advance | 0 | 1 | 1 | NO | DUPLICATE | ORN# 1013 |
| PloS one | | | | 266 | Population: Advance non-small cell lung | 1 | 1 | 0.02 | NO | STUDY DESIGN | |
| PloS one | | | | 266 | Population: Advance non-small cell lung | 1 | 1 | 0 | NO | DUPLICATE | ORN# 1008 |
| Annals of oncology | | | | 265 | Population: Asian patients with previously | 0 | 1 | 0 | NO | POPULATION | |
| Cancer research | | | | 265 | Population: Asian patients with previously | 0 | 1 | 0.98 | NO | DUPLICATE | ORN# 936 |
| Journal of Clinical Oncology | 40 | 27 | 3162 - 3171 | 264 | Population: Patients at 53 sites in china | 1 | 1 | 1 | YES | | |
| Journal of Clinical Oncology | | | | 264 | Population: Patients at 53 sites in china | 1 | 1 | 1 | NO | DUPLICATE | ORN# 917 |
| Thoracic Cancer | 13 | 15 | 2192 - 2200 | 263 | Population: Patients with Stage iiib/iv or | 1 | 1 | 1 | YES | | |
| Thoracic Cancer | | | | 263 | Population: Patients with Stage iiib/iv or | 1 | 1 | 1 | NO | DUPLICATE | ORN# 914 |
| Frontiers in Pharmacology | 13 | | 840889 | 262 | Population: Patients Diagnosed with | 1 | 1 | 0 | NO | STUDY DESIGN | |
| Frontiers in Pharmacology | | | | 262 | Population: Patients Diagnosed with | 1 | 1 | 0 | NO | DUPLICATE | ORN# 858 |

FIG. 6

SYSTEMS AND METHODS FOR SYSTEMATIC LITERATURE REVIEW

CROSS-REFERENCE TO RELATED APPLICATION

This application claims the benefit of priority to U.S. Provisional Patent Application No. 63/367,277, filed 29 Jun. 2022, entitled "SYSTEMS AND METHODS FOR SYSTEMATIC LITERATURE REVIEW."

The foregoing application is incorporated herein by reference in its entirety for all purposes.

BACKGROUND

Literature review is an important part of many compliance and assessment processes. In one example, literature review may be an important part of evidence-based medicine (EBM) or part of a health technology assessment (HTA) process. EMB and HTA use literature review to help determine the value of health technologies and treatments at different points in their lifecycle. However, literature review is typically a laborious and error-prone manual process requiring many hours of review to find pertinent publications.

SUMMARY

In some aspects, the techniques described herein relate to a computer-implemented method for automated systematic literature review, including: obtaining a set of inclusion criteria and a set of exclusion criteria for a set of categories, the set of categories may include a population category, an intervention category, a study design category, and an outcome category; obtaining data for a first publication of a study from a first database; for each category in the set of categories, formulating a question based on the set of inclusion criteria, the set of exclusion criteria, and the data for the first publication; for each category in the set of categories, generating an input to a trained language model, wherein each input includes the question; processing the set of inputs with the trained language model to generate a set of probability outputs, wherein the trained language model is fine-tuned on a question-and-answer task; determining a selection score by evaluating the set of probability outputs using a scoring function; and marking the first publication for selection based on the selection score.

In some aspects, the techniques described herein relate to a method, further including: obtaining second data for a second publication of a study; determining if the second publication is a duplicate of the first publication; and in response to determining that the second publication is the duplicate of the first publication, rejecting one of the first publication or the second publication based on a hierarchy rating of the first database and the second database.

In some aspects, the techniques described herein relate to a method, wherein the question has a yes or no answer.

In some aspects, the techniques described herein relate to a method, wherein the data of the first publication includes a title of the first publication and an abstract of the first publication.

In some aspects, the techniques described herein relate to a method, further including: generating inclusion keywords, wherein the inclusion keywords are generated based on the set of inclusion criteria; generating exclusion keywords, wherein the exclusion keywords are generated based on the set of exclusion criteria; and wherein formulating the first question includes formulating the question based on the set of inclusion criteria, the set of exclusion criteria, the inclusion keywords, the exclusion keywords, and the data for the first publication.

In some aspects, the techniques described herein relate to a method, further including: determining the frequency of occurrence of the inclusion keywords and the exclusion keywords in the data of the first publication; and ordering the inclusion keywords and the exclusion keywords based on the frequency of occurrence.

In some aspects, the techniques described herein relate to a method, wherein the scoring function is based on a hierarchy of categories in the set of categories.

In some aspects, the techniques described herein relate to a system for automated systematic literature review, including: an input generator configured to: obtain a set of inclusion criteria and a set of exclusion criteria for a set of categories, the set of categories may include a population category, an intervention category, a study design category, and an outcome category; and obtain data for a first publication of a study from a first database; a question formulation module configured to: for each category in the set of categories, formulate a question based on the set of inclusion criteria, the set of exclusion criteria, and the data for the first publication; and for each category in the set of categories, generate an input, wherein each input includes the question; a trained language model fine-tuned on a question-and-answer task configured to: process the input to generate a set of probability outputs; a presentation module configured to: determine a selection score by evaluating the set of probability outputs using a scoring function; and mark the first publication for selection based on the selection score.

In some aspects, the techniques described herein relate to a system, wherein the question has a yes or no answer.

In some aspects, the techniques described herein relate to a system, wherein the data of the first publication includes a title of the first publication and an abstract of the first publication.

In some aspects, the techniques described herein relate to a system, wherein: the input generator is further configured to: generate inclusion keywords, wherein the inclusion keywords are generated based on the set of inclusion criteria; generate exclusion keywords, wherein the exclusion keywords are generated based on the set of exclusion criteria; and the question formulation module is further configured to: formulate the first question based on the set of inclusion criteria, the set of exclusion criteria, the inclusion keywords, the exclusion keywords, and the data for the first publication.

In some aspects, the techniques described herein relate to a system, wherein the input generator module is further configured to: determine the frequency of occurrence of the inclusion keywords and the exclusion keywords in the data of the first publication; and order the inclusion keywords and the exclusion keywords based on the frequency of occurrence.

In some aspects, the techniques described herein relate to a system, wherein the scoring function is based on a hierarchy of categories in the set of categories.

In some aspects, the techniques described herein relate to one or more non-transitory, computer-readable media including computer-executable instructions that, when executed, cause at least one processor to perform actions including: obtaining a set of inclusion criteria and a set of exclusion criteria for a set of categories, the set of categories may include a population category, an intervention category, a study design category, and an outcome category; obtaining data for a first publication of a study from a first database; for each category in the set of categories, formulating a question based on the set of inclusion criteria, the set of exclusion criteria, and the data for the first publication; for each category in the set of categories, generating an input to a trained language model, wherein each input includes the question; processing the set of inputs with the trained language model to generate a set of probability outputs, wherein the trained language model is fine-tuned on a question-and-answer task; determining a selection score by evaluating the set of probability outputs using a scoring function; and marking the first publication for selection based on the selection score.

In some aspects, the techniques described herein relate to one or more non-transitory, computer-readable media, further including instructions that cause at least one processor to perform actions including: obtaining second data for a second publication of a study; determining if the second publication is a duplicate of the first publication; and in response to determining that the second publication is the duplicate of the first publication, rejecting one of the first publication or the second publication based on a hierarchy rating of the first database and the second database.

In some aspects, the techniques described herein relate to one or more non-transitory, computer-readable media, wherein the question has a yes or no answer.

In some aspects, the techniques described herein relate to one or more non-transitory, computer-readable media, wherein the data of the first publication includes a title of the first publication and an abstract of the first publication.

In some aspects, the techniques described herein relate to one or more non-transitory, computer-readable media, further including instructions that cause at least one processor to perform actions including: generating inclusion keywords, wherein the inclusion keywords are generated based on the set of inclusion criteria; generating exclusion keywords, wherein the exclusion keywords are generated based on the set of exclusion criteria; and wherein formulating the question includes formulating the question based on the set of inclusion criteria, the set of exclusion criteria, the inclusion keywords, the exclusion keywords, and the data for the first publication.

In some aspects, the techniques described herein relate to one or more non-transitory, computer-readable media, further including instructions that cause at least one processor to perform actions including: determining the frequency of occurrence of the inclusion keywords and the exclusion keywords in the data of the first publication; and ordering the inclusion keywords and the exclusion keywords based on the frequency of occurrence.

In some aspects, the techniques described herein relate to one or more non-transitory, computer-readable media, wherein the scoring function is based on a hierarchy of categories in the set of categories.

In some aspects, the techniques described herein relate to a computer-implemented method for training a model for automated literature review, the method including: obtaining a first set of inclusion criteria and a first set of exclusion criteria for a set of categories, wherein the set of categories may include a population category, an intervention category, a study design category, and an outcome category; obtaining data for a first publication of a study; obtaining a training data set, wherein the training data set includes a selection score for the first publication based on each of the first set of inclusion criteria and first set of exclusion criteria and the data of the first publication; for each category in the set of categories, formulating a question based on the first set of inclusion criteria, the first set of exclusion criteria, and the data for the first publication; for each category in the set of categories, generating an input to a trained language model, wherein each input includes the question; processing the set of inputs with the model to generate a set of probability outputs; comparing the set of probability outputs to the selection score to determine error values; and updating parameters of the model using backpropagation based on the error values.

In some aspects, the techniques described herein relate to a method, wherein the question has a yes or no answer.

In some aspects, the techniques described herein relate to a method, wherein the data of the first publication includes a title of the first publication and an abstract of the first publication.

In some aspects, the techniques described herein relate to a method, further including: generating inclusion keywords, wherein the inclusion keywords are generated based on the first set of inclusion criteria; generating exclusion keywords, wherein the exclusion keywords are generated based on the first set of exclusion criteria; and wherein formulating the question includes formulating the question based on the first set of inclusion criteria, the first set of exclusion criteria, the inclusion keywords, the exclusion keywords, and the data for the first publication.

In some aspects, the techniques described herein relate to a method, further including: ordering the inclusion keywords and the exclusion keywords based on a pseudo-random order, in the model training process.

In some aspects, the techniques described herein relate to a method, further including: obtaining, from the training data set, a publication with a positive answer of selection score according to the first set of inclusion and exclusion criteria; obtaining a second set of inclusion and exclusion criteria for the set of categories; comparing the first set of inclusion and exclusion criteria and the second set of inclusion and exclusion criteria to determine a similarity score; in response to the similarity score being below a threshold, generating a negative training sample with the second set of inclusion and exclusion criteria and a negative answer.

In some aspects, the techniques described herein relate to one or more non-transitory, computer-readable media including computer-executable instructions that, when executed, cause at least one processor to perform actions including: obtaining a first set of inclusion criteria and a first set of exclusion criteria for a set of categories, wherein the set of categories may include a population category, an intervention category, a study design category, and an outcome category; obtaining data for a first publication of a study; obtaining a training data set, wherein the training data set includes a selection score for the first publication based on each of the first set of inclusion criteria and first set of exclusion criteria and the data of the first publication; for each category in the set of categories, formulating a question based on the first set of inclusion criteria, the first set of exclusion criteria, and the data for the first publication; for each category in the set of categories, generating an input to a trained language model, wherein each input includes the question; processing the set of inputs with the model to generate a set of probability outputs; comparing the set of probability outputs to the selection score to determine error values; and updating parameters of the model using backpropagation based on the error values.

In some aspects, the techniques described herein relate to one or more non-transitory, computer-readable media, wherein the question has a yes or no answer.

In some aspects, the techniques described herein relate to one or more non-transitory, computer-readable media, wherein the data of the first publication includes a title of the first publication and an abstract of the first publication.

In some aspects, the techniques described herein relate to one or more non-transitory, computer-readable media, further including instructions that cause at least one processor to perform actions including: generating inclusion keywords, wherein the inclusion keywords are generated based on the first set of inclusion criteria; generating exclusion keywords, wherein the exclusion keywords are generated based on the first set of exclusion criteria; and wherein formulating the question includes formulating the question based on the first set of inclusion criteria, the first set of exclusion criteria, the inclusion keywords, the exclusion keywords, and the data for the first publication.

In some aspects, the techniques described herein relate to one or more non-transitory, computer-readable media, further including instructions that cause at least one processor to perform actions including: ordering the inclusion keywords and the exclusion keywords based on a pseudo-random order, in the model training process.

In some aspects, the techniques described herein relate to one or more non-transitory, computer-readable media, further including instructions that cause at least one processor to perform actions including: obtaining, from the training data set, a publication with a positive answer or selection score according to the first set of inclusion and exclusion criteria; obtaining a second set of inclusion and exclusion criteria for the set of categories; comparing the first set of inclusion and exclusion criteria and the second set of inclusion and exclusion criteria to determine a similarity score; in response to the similarity score being below a threshold, generating a negative training sample to the model with the second set of inclusion and exclusion criteria and a negative answer.

In some aspects, the techniques described herein relate to a system including: a training input generator configured to: obtain a first set of inclusion criteria and a first set of exclusion criteria for a set of categories, wherein the set of categories may include a population category, an intervention category, a study design category, and an outcome category; obtain data for a first publication of a study; obtain a training data set, wherein the training data set includes a selection score for the first publication based on each of the first set of inclusion criteria and first set of exclusion criteria and the data of the first publication; a question formulation module configured to: for each category in the set of categories, formulate a question based on the first set of inclusion criteria, the first set of exclusion criteria, and the data for the first publication; for each category in the set of categories, generate an input, wherein each input includes the question; a language model configured to: process the set of inputs with the model to generate a set of probability outputs; and a training module configured to: compare the set of probability outputs to the selection score to determine error values; and update parameters of the model using backpropagation based on the error values.

In some aspects, the techniques described herein relate to a system, wherein the question has a yes or no answer.

In some aspects, the techniques described herein relate to a system, wherein the data of the first publication includes a title of the first publication and an abstract of the first publication.

In some aspects, the techniques described herein relate to a system, wherein: the input generator is further configured to: generate inclusion keywords, wherein the inclusion keywords are generated based on the first set of inclusion criteria; generate exclusion keywords, wherein the exclusion keywords are generated based on the first set of exclusion criteria; and the question formulating module is further configured to formulate the question based on the first set of inclusion criteria, the first set of exclusion criteria, the inclusion keywords, the exclusion keywords, and the data for the first publication.

In some aspects, the techniques described herein relate to a system, wherein the input generator module is further configured to order the inclusion keywords and the exclusion keywords based on a pseudo-random order, in the model training process.

BRIEF DESCRIPTION OF THE FIGURES

The invention and the following detailed description of certain embodiments thereof may be understood by reference to the following figures:

FIG. 4 shows a table of example criteria based on the PICOS framework.

FIG. 6 is an example output interface.

DETAILED DESCRIPTION

A systematic literature review (SLR) is a type of literature review that follows a rigorous and systematic methodology to collect available and relevant research on a specific topic, critically appraise each study, and combine findings from different studies to arrive at an evidence-based conclusion. Systematic reviews are regarded as the highest level of evidence in evidence-based healthcare, primarily due to the rigorous methodology followed in conducting these reviews, which minimizes bias and ensures a comprehensive coverage of the available evidence on the topic. SLR may include a plurality of steps for planning, executing, interpreting, and reporting of results.

Figure 1:
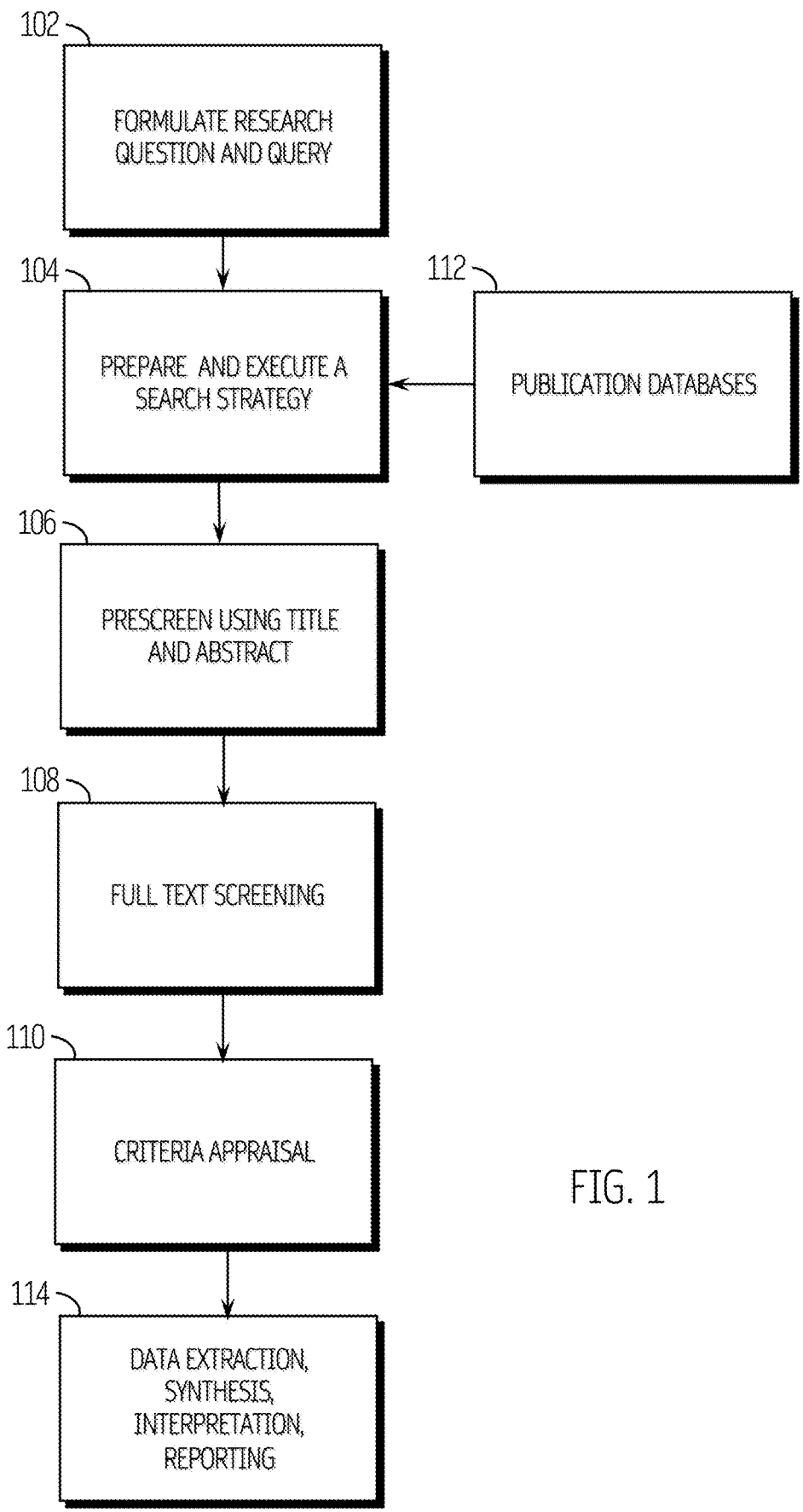
FIG. 1 is a flowchart of one example SLR process.

FIG. 1 is a flowchart of one example SLR process. In one example, the steps of SLR may include first formulating a research question 102. Once the research question is established, a systematic search strategy is developed and executed 104 to find all the available literature on the topic, typically involving multiple databases, and may also include other sources, like the reference lists of identified articles, relevant journals, and conference proceedings 112. The identified studies may then be screened based on predefined criteria. This process typically involves two stages—initial screening based on titles and abstracts 106, and full-text screening for those that pass the initial stage 108. Each study that passes the screening stage may then be appraised for selected criteria 110, followed by additional steps that include data extraction from each study, data synthesis of the gathered data, interpretation, and reporting of the results 114.

In many instances, an initial screening of search results may be a bottleneck in an SLR process. In one aspect, depending on the research question, there could be thousands or even tens of thousands of search results that initially seem relevant, and each of these needs to be screened. In another aspect, to reduce bias and error, screening is often performed by more than one reviewer independently. In cases where the reviewers disagree on the inclusion or exclusion of a study, time must be spent resolving the disagreement, which can further slow the process. In another aspect, publications of studies are complex, with sometimes unclear methodologies or outcomes, making it difficult to determine their relevance during screening. In yet another aspect, the screening process requires a significant amount of human resources. Each potential study needs to be read and assessed by reviewers, which can be a strain, particularly in a large review or in situations where resources and/or time are limited. In many cases, a team of well-trained personnel may require 400 or more hours to complete a screening of search results for one question. The time required for review and prescreening publications often results in a significant time span between the time of a publication and inclusion in a review. The lag between publication and review may cause analysis of outdated publications and a lack of timely inclusion of the newest studies.

In some cases, systematic reviews utilize machine learning (ML) and artificial intelligence (AI) technologies for initial screening processes. However, existing AI and ML methods have many practical limitations. In one aspect, existing methods use a plurality of models during the initial screening process. The use of a plurality models increases the overall error of the screening process as errors propagate and are compounded by successive models. The lack of accuracy of the models often means that the existing automated screening processes require time-intensive human review and/or often reject relevant results. In another aspect, the use of many models increases maintenance and training requirements as each model requires separate considerations for retraining and updating. In another aspect, previous methods lacked generalizability and performed differently for different topics and disciplines. In yet another aspect, the use of different models can result in increased computer resource requirements as each model may require separate memory and resources for execution and training.

Embodiments described herein provide several benefits and improvements over prior manual, ML, and AI methods. In one aspect, the systems and methods described herein utilize fewer models than previous methods while attaining or, in many cases, exceeding the accuracy of trained reviewers. In some embodiments, one trained model may be used to perform the prescreening process. In another aspect, embodiments described herein provide an improvement to computer technology. The systems and methods described herein require less computer memory and/or have fewer hardware requirements as they utilize fewer trained models than previous methods. In another aspect, the systems and methods described herein provide high accuracy in screening a large variety of results for a variety of criteria, even if the model was not directly trained on criteria. In another aspect, the systems and methods described herein provide for efficient training of a model used for the prescreening process. As described herein, the model may be trained using a small number of labeled data requiring less time and resources to build training sets.

Figure 2:
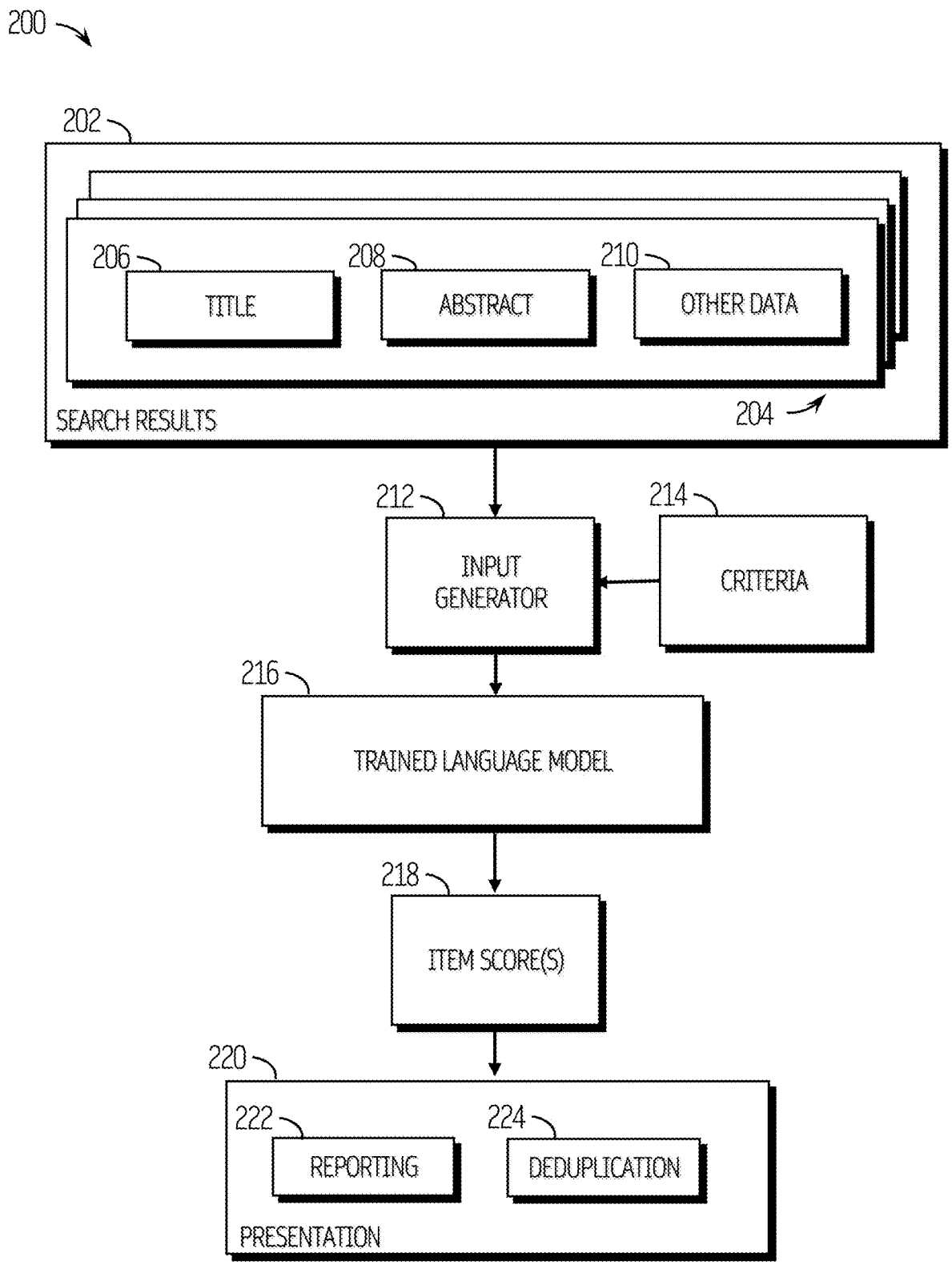
FIG. 2 is an example system for prescreening search results.

FIG. 2 is an example system 200 for prescreening search results. The system may be configured to receive a set of search results 202. The search results may include a plurality of items 204. Each item may include one or more data elements. In the case of publications such as case studies, the data elements may include text such as the title 206, abstract 208, and other data 210 related to the publication. In some cases, the other data may include the type of publication, the source of the publication, the date of publication, the authors, the full text of the publication, and the like. The search result data may be received as a spreadsheet file, database, XML file, or any other suitable data format.

The search results may be processed by a trained language model 216. The trained language model may receive inputs from an input generator 212. The input generator 212 may generate the input to the trained language model 216 that synthesizes the input from the elements of each data item and criteria data 214. The criteria data 214 may include data such as inclusion and/or exclusion criteria for evaluating the data items. In one example, elements of the criteria data 214 may be appended or combined with the elements of each data item to generate an input to the model 216. The model 216 may process the input from the input generator 212 and provide an output. In embodiments, the output may include one or more item scores 218. The model 216 may be configured and/or trained such that one or more item scores 218 provide an indication if the search result item (i.e. title and abstract of a publication) meets the criteria 214 for selection. Based on the item scores 218, the item (i.e. a study publication) may be rejected and marked for rejection during the pre-filtering process. In one example, one or more item scores 218 may be a numerical value between 0 and 1, and a threshold value for a score may be used for determining if an item should be rejected during the prescreening process.

The system 200 includes one trained model 216. In some embodiments, more than one trained model may be used. However, as described herein, using a few models (one or two models) for the system provides a number of benefits such as smaller system resource requirements and easier system maintenance with respect to the updating of models and training. In embodiments, model 216 may be a fine-tuned pre-trained language model. The model may include transformer-based models such as the Bidirectional Encoder Representations from Transformers (BERT) model or other similar models.

Figure 3:
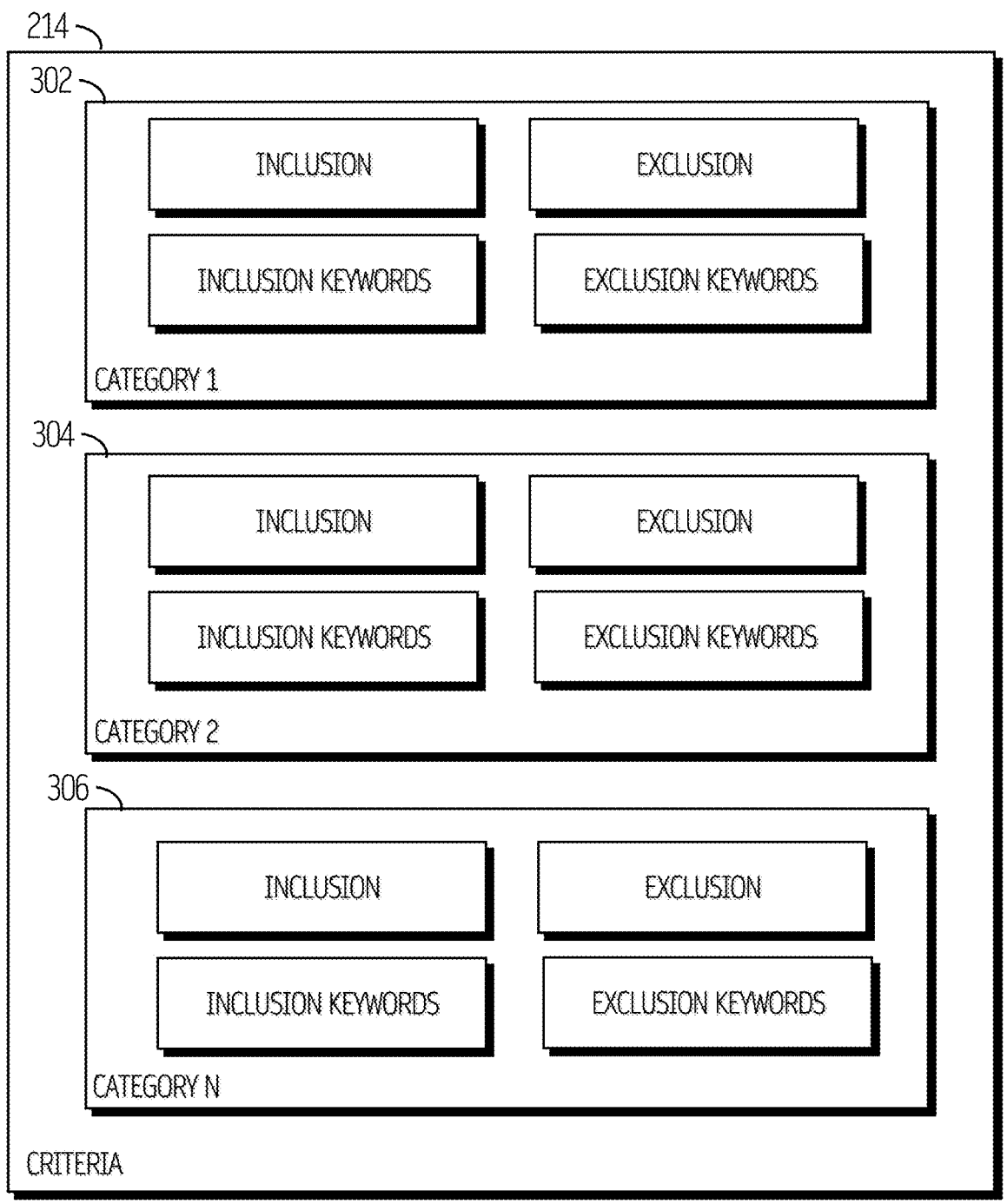
FIG. 3 shows additional aspects of selection criteria.

FIG. 3 shows additional aspects of criteria 214 that may be used by system 200. The criteria 214 may include one or more categories of criteria 302, 304, and 306. Each of the categories may include separate inclusion and/or exclusion criteria. The inclusion and exclusion criteria may be a list of words or concepts that describe or identify inclusion and/or exclusion criteria for including and/or excluding a search result during the prescreening process. In embodiments, inclusion and/or exclusion criteria may be manually created by a user. In embodiments, inclusion and/or exclusion criteria may be determined according to industry standards, compliance requirements, and the like.

In some embodiments, the inclusion and/or exclusion criteria may be expanded to include inclusion and/or exclusion keywords. In embodiments, the inclusion and/or exclusion keywords may be generated to expand the vocabulary of inclusion and/or exclusion criteria. In embodiments, the inclusion keywords and/or the exclusion keywords may be provided by a user of the system. In some embodiments, the keywords may be generated, at least in part, automatically from the inclusion and/or exclusion criteria. In one example, the keywords may be generated automatically by determining synonyms or consulting industry knowledgebases to identify similar words or concepts to those identified in the inclusion and/or exclusion criteria.

In one example, criteria may be based on the PICOS framework. The PICOS framework serves as a systematic approach for defining the parameters of a research question and crafting an effective literature search strategy for systematic reviews. PICOS is an acronym where 'P' denotes Patient, Problem, or Population; 'I' stands for Intervention; 'C' signifies Comparison; 'O' represents Outcome; and 'S' indicates Study Type. The 'P' in PICOS pertains to the specific demographic or cohort that is the primary focus of the research question. Criteria in this category may define a particular group of patients delineated by characteristics such as age, gender, or ethnicity, or those afflicted with a specific disease or condition. The 'I' in PICOS corresponds to the Intervention, signifying the action or treatment under examination. Criteria in this category may define a specific medication, a therapeutic procedure, a diagnostic method, or lifestyle modifications like changes in diet or exercise regimens. The 'C' of PICOS symbolizes Comparison, which refers to the alternative against which the intervention is evaluated. Criteria in this category may include aspects of a procedure, a placebo, or the standard care regimen. In certain cases, there may be no comparison involved. The 'O' in PICOS stands for Outcome and criteria may include the effects or endpoints utilized to gauge the efficacy of the intervention. Lastly, the 'S' in PICOS signifies Study Type, and the criteria in this category may define aspects of the kind of studies that will be included in the review.

FIG. 4 shows a table of example criteria based on the PICOS framework. The table shows example inclusion and exclusion criteria where each row corresponds to different categories in the PICOS framework. The inclusion and exclusion criteria for each category (row in the figure) include lists of words and concepts that describe and define each category. The table of FIG. 4 further includes additional inclusion keywords and exclusion keywords for each criteria category. The inclusion keywords and exclusion keywords may be generated from the inclusion criteria and the exclusion criteria of each criteria category, respectively. The keywords may be automatically generated by selecting synonyms or antonyms of words of the criteria.

Figure 5:
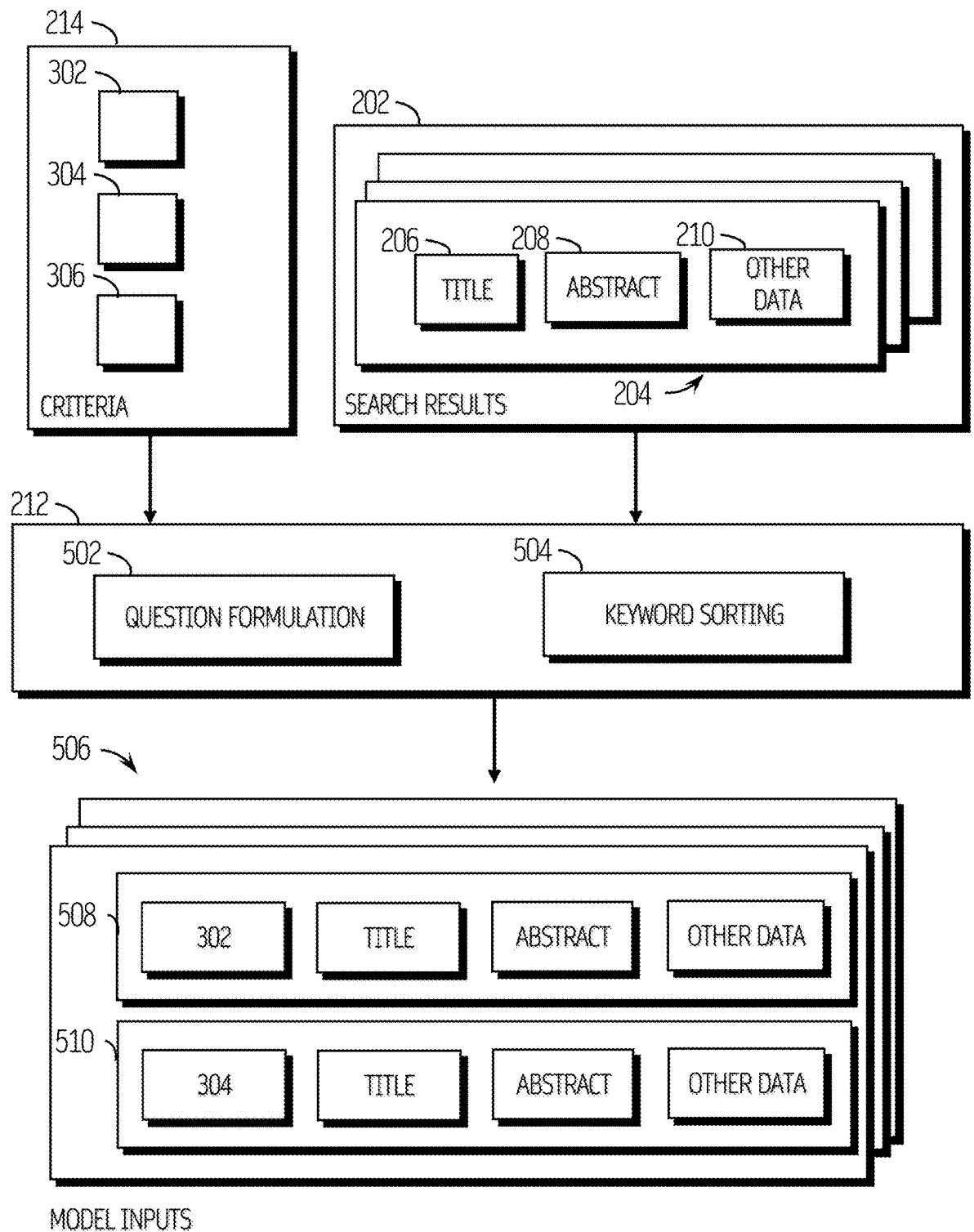
FIG. 5 shows additional aspects of an input generator.

FIG. 5 shows additional aspects of the input generator 212 that may be included in the system 200. The input generator 212 may receive criteria data 214 and the set of search results 202 and generate inputs for a model 506. In embodiments, the model inputs 506 may be formulated as one or more questions 508, 510. Each question 508, 510 may include elements of criteria 214 and elements of the search results 202. In embodiments, the number of questions formulated for each search result may depend on the constraints of the model. In some cases, a model that receives the inputs from the input generator 212 may be limited with respect to the size of the input and may have a finite limit as to the number of characters, words, and/or tokens that can be provided to the model. In some cases, one question may be formulated for all the criteria. However, when input would exceed the input limits of the model, multiple smaller questions may be generated as input to the model.

In one example, when multiple questions are generated for each search result by the input generator 212, each question input may correspond to each category of criteria. In one example, criteria 214 may include a plurality of criteria categories 302, 304, 306. In one example, the criteria categories 302, 304, 306 may correspond to PICOS categories described herein. The criteria categories 302, 304, 306 may include one or more of inclusion criteria, exclusion criteria, inclusion keywords, or exclusion keywords. The input generator 212 may generate inputs to a model, wherein a separate question is generated for each criteria category. In one embodiment, an input generated by the input generator 212 may be a question that includes inclusion criteria, exclusion criteria, inclusion keywords (if any), exclusion keywords (if any) for a criteria category and further includes context data for the search result. The context data for the search result may include the title and/or abstract of the search result and, optionally, other data associated with the search result, such as a publication type.

The input generator 212 may generate inputs to a model utilizing a question formulation 502 module. The question formulation module 502 may concatenate criteria and data from the search item (i.e. the title and abstract), and reformat the data into a question. For example, for input items [abstract], [title], [include criteria], [include keywords], [exclude criteria], and [exclude keywords] (where each [item] is representative of content of "item") may be formatted as a question 508 by the input generator 212. The question may take the form of "Should [abstract] and [title] be accepted based on [include criteria], and [include keywords] or excluded based on [exclude criteria] and [exclude keywords] ?" The question may be formulated as a "yes or no" question wherein a valid answer to the question is a "yes" answer or a "no" answer.

In embodiments, the input generator 212 may generate questions and complete sentences with proper question words and punctuation. In some embodiments, the question may be formulated as a pseudo-question. A pseudo-question may be a question but may not include punctuation and/or a question word (such as "should," "does," etc.). A pseudo question may include other special tags that can be interpreted by the model to identify the input as a question and may include special tags or special tokens to identify the start of different inputs such as the abstract, inclusion criteria, exclusion criteria, and the like. A special tag or a special token may be a character or a series of characters and or a numerical value that may be included to identify types of input.

In embodiments, the input generator 212 may further include a keyword sorting 504 module. The sorting 504 may be configured to reorder inclusion keywords and/or exclusion keywords based on keyword order criteria. In one example, keyword order criteria may be based on the frequency of keywords in the abstract and/or titles of the search results. The frequency of the keywords may be determined by searching for each keyword in the abstract and/or title of the search results and identifying how many times each keyword appears. The keywords may be ordered with the most frequent keywords being ordered first and the least frequent keywords being ordered last. Inclusion keywords and exclusion keywords may be ordered separately. The keyword sorting 504 module may be configured to preferentially remove keywords from the end of the list (keywords that have the fewest frequency in the search results) when the length of the generated question by the input generator 212 is too long for the input to the model. By sorting the keywords with the sorting 504 module based on the frequency of occurrence in the search results, the length of the input to the model generated by the input generator 212 may be maintained while allowing the input to be shortened when necessary.

In embodiments, a trained model 216 may receive the input 506 and process the input 506 to generate an output that is indicative if the search item should be selected in view of the criteria in the input 506. In the case where multiple inputs 508, 510 are generated for one search item, the model 216 may generate multiple outputs where each output reflects acceptance or rejection for the criteria included in each input. In one example, a model may receive multiple input questions wherein each input question for a search result is associated with a criteria category of the PICOS framework. The model may generate an output for each of the inputs corresponding to each of the criteria categories. In embodiments, the plurality of outputs of the model corresponding to the different criteria categories may be assessed together to determine an overall determination of selection during the prescreening process. In one example, an overall inclusion or exclusion for a search item may be determined based on a scoring function of the individual outputs for each criteria category. In embodiments, the criteria categories may be associated with a priority and/or a hierarchy that can be defined by a user. The priority and/or hierarchy may be provided to the scoring function.

In embodiments, the system 200 may further include a presentation 220 module configured to provide an output of the prescreening results. In embodiments, the output of the prescreening results may be generated by a reporting module 222. The reporting module 222 may generate a file (such as a table, or a spreadsheet), a GUI display, and/or other output that can be viewed by a user or used by another automated process such as another process in SLR. In one example, the output may include a table of the results.

In embodiments, the presentation 220 module may further include a deduplication 224 module. The deduplication 224 module may be configured to identify duplicate items in the results. In some cases, search results 202 may include duplicate items such as articles or studies that were published in different locations or sourced from different databases. The deduplication 224 module may identify duplicate items by comparing elements of the items such as the title and/or the abstract and other elements such as authors, date of publication, and the like. The deduplication 224 module may be configured to identify one of the duplicate items as the primary item based on criteria such as the source of the item. In one example, databases that publish the articles may be assigned a hierarchy and the publication of the database with the highest position in the hierarchy may be assigned as a primary item and the others as duplicates.

FIG. 6 depicts aspects of an example output generated by the system 200. The output may be a table with each row corresponding to a different item of the search results. Each item may include data (columns) that identify data of the item (journal, abstract, title), the predicted probability of inclusion/exclusion (selection), reasons for rejection, identification of duplicates, and the like. The output may include the probability of inclusion/exclusion for each criteria category and a reason for rejection which identifies which of the criteria categories resulted in an inclusion/exclusion probability that caused the rejection.

In embodiments, the model 216 used in system 200 may be a fine-tuned language model. The language model may be a transformer-based model such as the Bidirectional Encoder Representations from Transformers (BERT) model. The model may be pre-trained on general text data and may be pre-trained on relationships between different words and/or sentences. In some cases, the model also be further pre-trained on domain-specific text such as biomedical text. The model may include an input embedding layer that converts the input text into corresponding vector representations, or embeddings. The model may further include multiple layers of transformer encoders stacked on top of each other. The model may include one or more output layers, such as a linear layer and/or a softmax function to generate a probability output.

The pre-trained model is further fine-tuned for the inclusion/exclusion task described herein. The model is fine-tuned using a labeled corpus of prescreened data to effectively provide a probability output for a question input as outlined herein.

Figure 7:
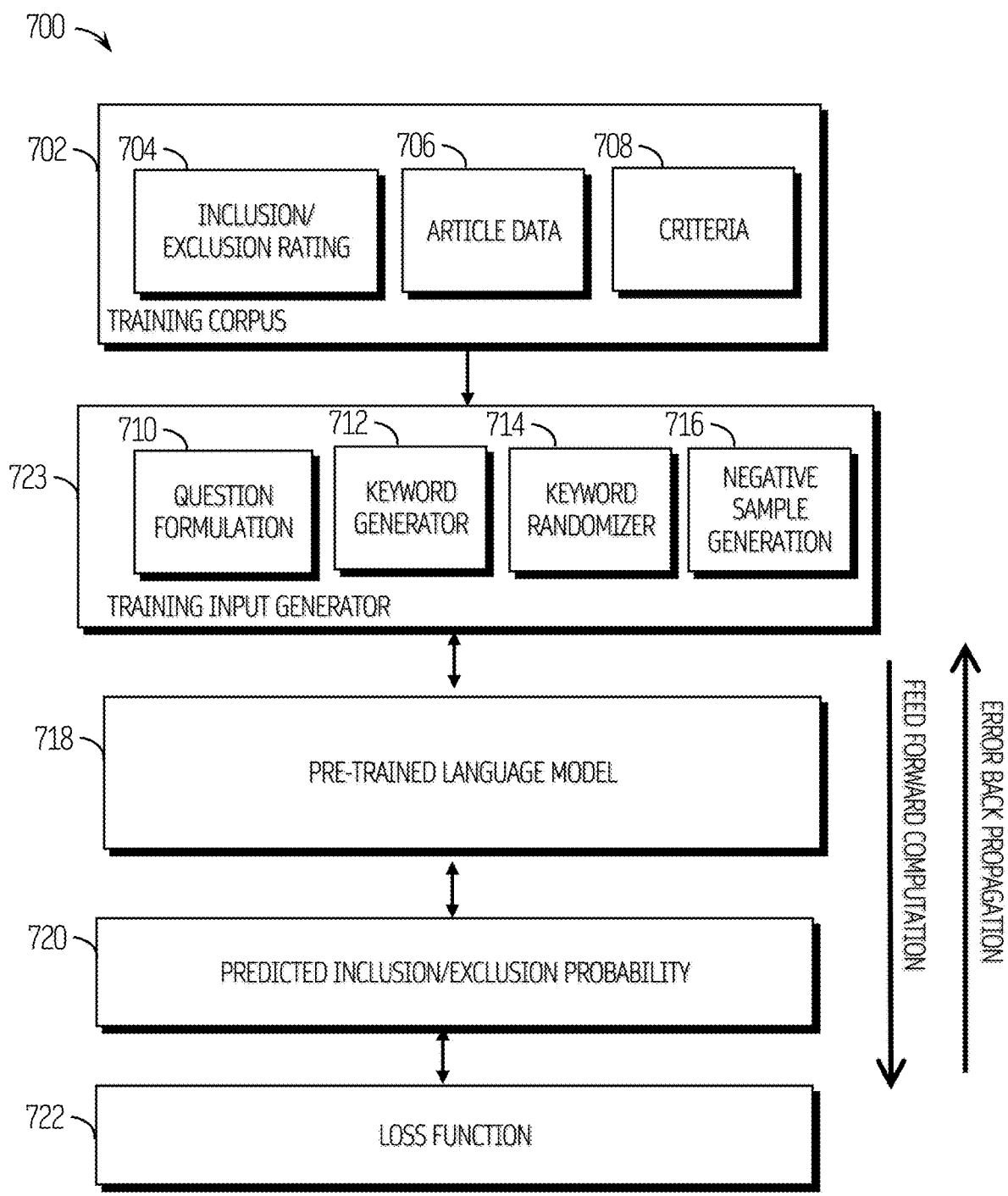
FIG. 7 depicts aspects of an example system for training a model using a question-and-answer task.

FIG. 7 depicts aspects of an example system 700 for training a model using a question-and-answer task as described below. In embodiments, as described herein, the model may be a pre-trained language model and training, as used herein, may refer to fine-tuning a pre-trained language model for the task of prescreening search results based on a set of criteria. In embodiments, the model is trained using labeled training data. The labeled data may be used to formulate a question about the training data and the label of the data may be used as the expected result of the question. During training, the model is used to predict the outputs for the training data, and these predictions are compared to the actual labels to compute the loss. This loss reflects how far the model's predictions are from the actual values. The parameters of the model are then adjusted using backpropagation so that this loss decreases. Backpropagation computes the gradient (rate of change) of the loss function with respect to the model's weights. Once gradients are calculated, an optimization algorithm like Stochastic Gradient Descent (SGD) may be used to adjust the weights of the model. This process of making predictions, calculating loss, computing gradients, and adjusting parameters is repeated for many iterations or epochs until the performance of the model is satisfactory.

The system 700 may obtain data from a training corpus 702. The training corpus 702 may include labeled data that may include previously prescreened search data wherein the prescreening was performed by human reviewers. The training corpus 702 may include the search item data such as the article data 706 (i.e. title and/or abstract), criteria 708 used to evaluate the article, and inclusion/exclusion decision 704 of the reviewer. The system 700 may include a training input generator 723 that prepares the training corpus 702 data for input to the pre-trained language model 718.

The training input generator 723 may include a keyword generator 712. The keyword generator 712 generates keywords to complement the inclusion and/or exclusion criteria 708. In some cases, the training corpus 702 may not include keywords or may include a limited number of keywords. The keyword generator 712 may generate or expand a list of keywords based on the inclusion criteria and/or the exclusion criteria. In some embodiments, the keywords may be generated, at least in part, automatically from the inclusion and/or exclusion criteria. In one example, the keywords may be generated automatically by determining synonyms or consulting industry knowledgebases to identify similar or dissimilar words or concepts to those identified in the inclusion and/or exclusion criteria 708.

The training input generator 723 may include a keyword randomizer 714. The keyword randomizer may generate random or pseudo-random ordering of the keywords. The keyword randomizer 714 may be configured to generate a random ordering of the keywords for each training sample, a batch of samples, and/or each training epoch.

The training input generator 723 may include a question formulation 710 module. The question formulation 710 module may be configured to receive one or more of the criteria data 708 (inclusion and exclusion criteria), article data 706 (such as a title and/or abstract), and keyword data from the keyword generator 712 and generate training inputs for the model 718. In embodiments, the question formulation 710 may formulate the training inputs as one or more questions. The question may be formulated as a "yes or no" question wherein an answer to the question is a "yes" answer or a "no" answer. In embodiments, the number of training inputs formulated for each search result may depend on the constraints of the model 718. In some cases, a model 718 may be limited with respect to the size of the input and may have a finite limit as to the number of characters, words, and/or tokens that can be provided to the model. In some cases, one question may be formulated for each category in the criteria 708. However, when input would exceed the input limits of the model, multiple smaller questions may be generated as input to the model, wherein each question may correspond to a different criteria category. In some embodiments, the question generated by the question formulation 710 module may be formulated as a complete question that includes one or more sentences or may be a pseudo-question. A pseudo-question may be a question but may not include punctuation and/or a question word (such as "should", "does", etc.). A pseudo question may include other special tags that can be interpreted by the model to identify the input as a question and may include special tags or special tokens to identify the start of different inputs such as the abstract, inclusion criteria, exclusion criteria, and the like.

The generated questions may be processed by the model 718 to generate a predicted inclusion/exclusion probability 720 for the article based on the provided elements of the article data 706 and criteria 708 in the question. The inclusion/exclusion probability 720 may be compared to the actual values of the inclusion/exclusion ratings 704 of the training corpus 702 to compute the loss using loss functions such as the cross-entry loss function, margin-based loss function, and the like. In embodiments, any suitable loss function can be used. The parameters of the model 718 may then be updated using backpropagation.

In embodiments, the training input generator 723 may further include a negative sample generation 716 module. The negative sample generation 716 module may be configured to generate additional training samples from the positive training samples of the training corpus 702. A positive sample from the training corpus 702 may include any sample where the inclusion/exclusion decision 704 indicated that article data 706 was accepted for inclusion during a pre-screening process (i.e. article data meets the criteria for inclusion). The negative sample generation 716 module may generate a negative sample by identifying a different set of criteria for the positive sample. A different set of criteria may be selected such that it is at a large distance away from the set of criteria of the positive sample and would be expected to result in the exclusion of the article when paired with the article data. In one example, the negative sample criteria may be selected by exchanging the inclusion and exclusion criteria such that the inclusion criteria of the positive sample become the exclusion criteria of the negative sample and/or the exclusion criteria of the positive sample becomes the inclusion criteria of the negative sample. The negative sample, which may include exclusion rating, the article data from the positive sample, and the different criteria. The negative sample may be provided to the keyword generator 712, keyword randomizer 714, and question formulation 710 to generate a negative training input to model 718.

After fine-tuning, the model 718 may be validated using different metrics such as validating on a test portion of the labeled data, cross-validation, comparing with baselines and the like.

Figure 8:
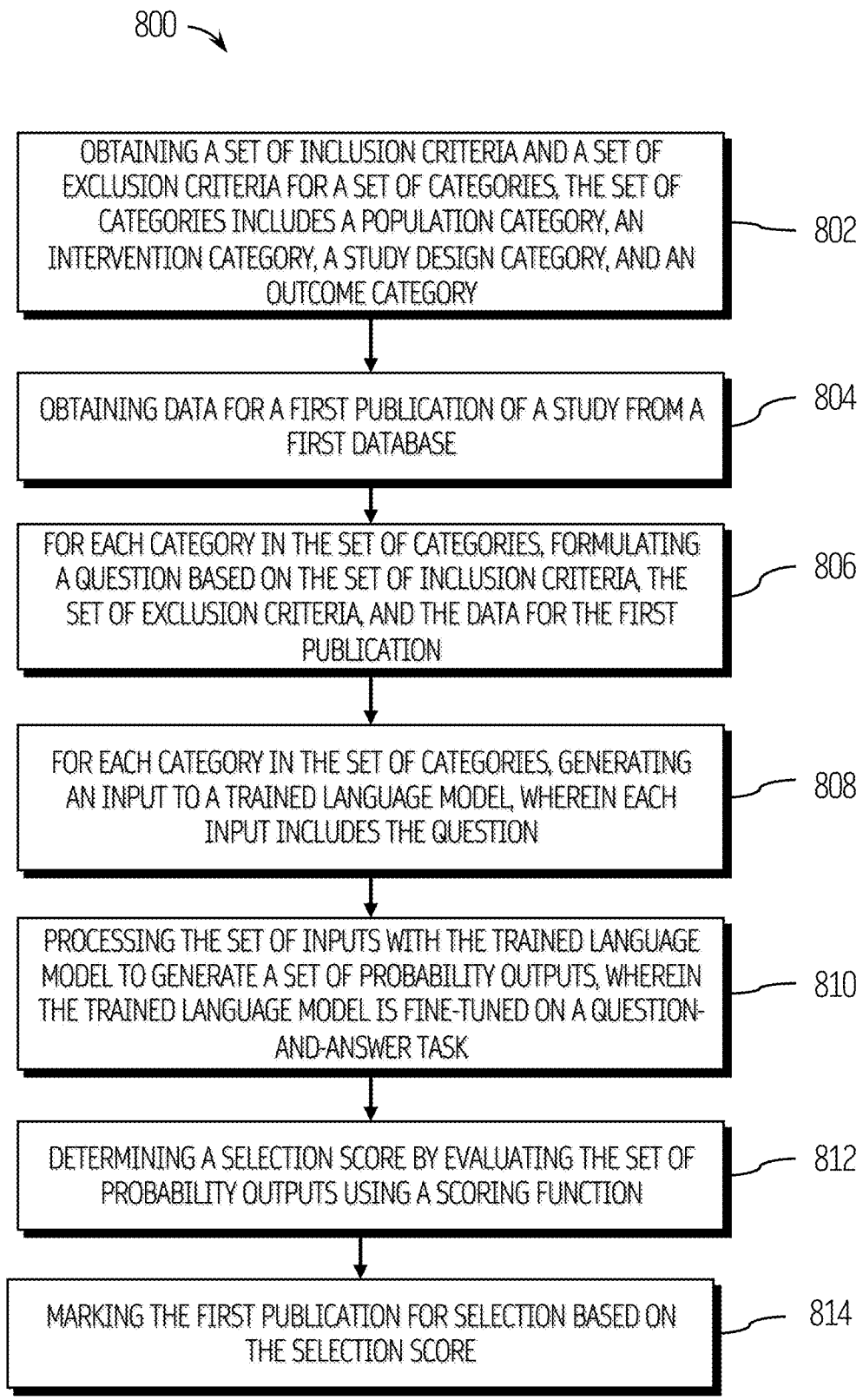
FIG. 8 is a flowchart of an example method for an automated systematic literature review.

FIG. 8 is a flowchart of an example method 800 for an automated systematic literature review. The method may be implemented by the elements of system 200 depicted and described with respect to FIGS. 2, 3, and S. The method may include a step of obtaining a set of inclusion criteria and a set of exclusion criteria for a set of categories 802. In one example, the set of categories may include categories from a PICOS framework and may include a population category, an intervention category, a study design category, and an outcome category. The number and types of categories may be selected based on the requirements of the search, the domain of the search, compliance requirements, and/or by manual configuration from a user. The inclusion criteria may identify words, sentences, or other data that are indicative of concepts or subjects that are eligible to be included in the research. Exclusion criteria may include words, sentences, or other data, that is indicative of concepts or characteristics that disqualify prospective literature from inclusion. Inclusion and/or exclusion criteria can vary widely based on the research questions and could be defined by industry standards, compliance standards, and/or user selection.

In embodiments, the inclusion criteria and exclusion criteria may be complemented with a set of inclusion keywords and exclusion keywords, respectively. A set of inclusion keywords may be generated for inclusion criteria. A set of exclusion keywords may be generated for exclusion criteria. As described herein, the keywords may be generated by a person or automatically using any appropriate method such as one or more thesaurus, dictionary, language model, and the like. In embodiments, the inclusion keywords and/or the exclusion keywords may be sorted according to an order. An order may be a random or pseudo-random order. An order may be alphabetical order. In some embodiments, the order may be according to the frequency of occurrence of each keyword in the text of the search results.

The method 800 may further include the step of obtaining data for a first publication of a study from a first database 804. In some cases, the database may be a file or a local or remote storage location in which data from a literature search is stored. As described herein, a search of literature may include a search of various databases and files. The data from the search may include various data such as complete articles, links to articles, and partial data from the articles (such as title and/or abstract). The data returned from the search may be stored in a local database or any appropriate electronic storage medium. Obtaining data for the first publication of the study from a first database 804 may include obtaining data from the search for the article that may be stored in a local database. In some cases, obtaining data for the first publication of the first study may include retrieving data from an original database from where the publication was located during the literature search.

The method 800 may further include a step of formulating a question 806. In embodiments, a different question may be formulated for each criteria category in the set of criteria categories. In some cases, one question may be formulated based on criteria of all the criteria categories. In one example, a question may be formulated based on the set of inclusion criteria, the set of exclusion criteria, and the data for the first publication for each of the criteria categories. When inclusion and/or exclusion keywords are available, the question may include the inclusion/exclusion keyword. In embodiments, a question may be formulated based on the set of inclusion criteria, the set of exclusion criteria, the set of inclusion keywords, the set of exclusion keywords, and the data for the first publication.

As described herein, the number of questions and what data is included in each question may depend on the constraints on the inputs of a model. A model input may be constrained and may have a maximum limit on the number of words or tokens that can be provided as input. The maximum limit on the number of words or tokens may dictate how many questions are formulated. In one example, for each criteria category, one question may first be formulated, when the question exceeds the maximum limit on the number of words or tokens, the question may be discarded, and multiple smaller questions may be formulated. The number of questions, and what data is included in the questions, may be adjusted to meet the maximum input limit.

In embodiments, elements, such as inclusion/exclusion keywords of the question, may be eliminated or shortened to generate a question that meets the constraints of the inputs of a model. As described herein, inclusion/exclusion keywords may be ordered based on the frequency of occurrence of keywords in the title and abstract sets of the search results and the ordered sets of keywords may be shortened such that the keywords with the lowest frequency are preferentially removed first.

In embodiments, as described herein, a question may be formatted as a complete sentence or may be a pseudo-question that may not be formatted as a full sentence. The question may be formatted such that that question may have a yes or no answer.

The method 800 may further include a step of generating an input to a trained language model 808. In embodiments, each input may include one or more questions generated at step 806. The input may be formatted for input to a model. In one example, generating an input may include adding special tokens that identify elements of the input, such as separators between sentences, special tokens to identify inclusion criteria or exclusion criteria, or special tokens to identify the context of the input. Generating an input may further include tokenizing the input using any appropriate tokenizer. The trained language model may be a fine-tuned language model. The trained language model may be fine-tuned on a question-and-answer task. In one example, the language model may be fine-tuned using the systems and methods described with respect to FIG. 6.

The method 800 may further include a step for processing the inputs with the trained language model to generate one or more probability outputs 810. In embodiments, one probability output may be generated for each input question. In the case where a set of input questions is provided to a model, the model may output a set of probabilities where each probability corresponds to an input question. A probability output generated by the model may be indicative of an answer to the question provided to the model. In embodiments, the output probability may be calibrated using training data. In one example, the probability output may be indicative of a "yes" answer or a "no" answer to a question input to the model. The probability output may be an output with a value between 0 and 1 and values larger than a threshold value may be interpreted as a "yes" answer and as a "no" answer otherwise. The probability output of the model may be indicative of a yes or a no answer to a question regarding the selection of a publication based on inclusion and/or exclusion criteria included in the question.

The method 800 may further include a step of determining a selection score by evaluating the set of probability outputs using a scoring function 812. In embodiments, the scoring functions may compare the probability output for a question input to a threshold value to determine a selection score. In one example, the selection score may be a value of 0 or a value of 1 that are indicative of a probability output being smaller, or larger or equal to a threshold value respectively. In one example, a value of "0" for a selection score may be indicative of "no selection," and a value of "1" may be indicative of "selection" of the publication.

In some embodiments, the selection score may be a function of two or more probability outputs. For example, a selection score may be a function of the set of probabilities outputs corresponding to the set of question inputs for different criteria categories. A selection score may be based on a hierarchy or priorities of the criteria categories of each question.

The method 800 may further include a step of marking the first publication for selection based on the selection score 814. The marking may indicate if the publication should be selected or not selected based on the selection score. The marking may be stored in association with data for each publication, such as in a table or a database. In embodiments, the marking may indicate the reasons for non-selection and may include the value of the selection function, question or criteria category that caused a non-selection, and the like.

In embodiments, steps of method 800 may be repeated for all publications or items identified in a search. Items in search results may be processed sequentially with one model, or in parallel using multiple instances of a model to generate a list of preprocessed search results. The preprocessed search results may be used by elements of an SLR system to review the selected references.

Figure 9:
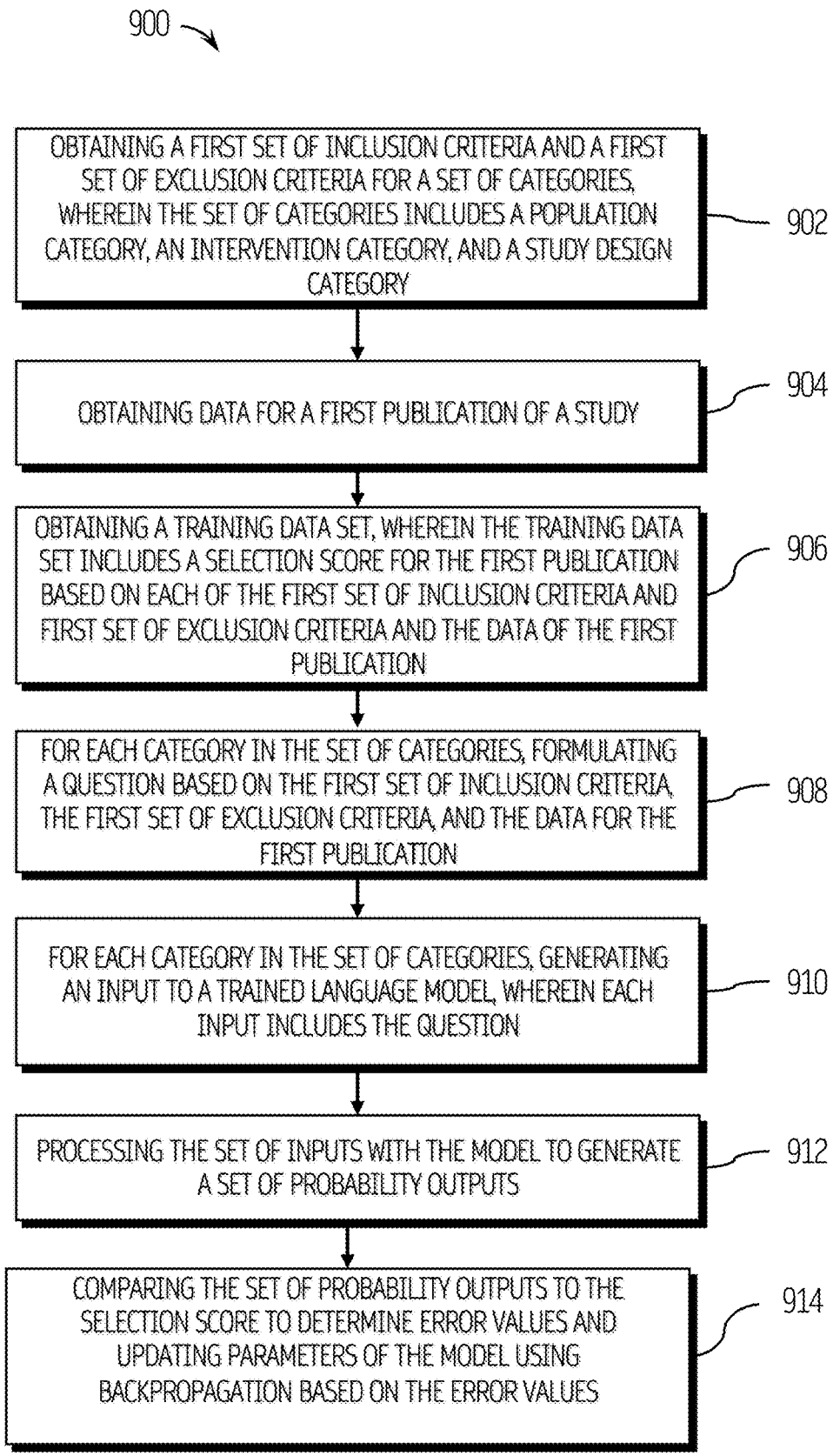
FIG. 9 is a flowchart of an example method for training a model for automated literature review.

FIG. 9 is a flowchart of an example method 900 for training a model for automated literature review. The method may be implemented by the elements of the system depicted and described with respect to FIG. 7. The method may include obtaining a first set of inclusion criteria and a first set of exclusion criteria 902. The inclusion and/or exclusion criteria may include a plurality of sets of inclusion and/or exclusion criteria wherein each set may correspond to a different criteria category. In embodiments, criteria categories may correspond to categories of a PICOS framework as described herein. In one example, the criteria categories may include a population category, an intervention category, a study design category, and an outcome category. In embodiments, the inclusion criteria and exclusion criteria may be complemented with a set of inclusion keywords and exclusion keywords, respectively. The inclusion keywords and exclusion keywords may be generated as described herein using any appropriate methods such as based on user input, using a language model, or other models. In embodiments, the inclusion keywords and/or the exclusion keywords may be sorted using a random order or a pseudo-random order. In embodiments, keywords order may be changed for each input to a model.

The method 900 may further include the step of obtaining data for a first publication of a study 904. The data for the first study may be obtained as part of a step of obtaining a training data set 906. The training data set may further include a selection score (also referred to herein as an annotated answer) for the first publication based on each of the first set of inclusion criteria, the first set of exclusion criteria, and the data of the first publication. The training data set may be, or may be derived from, prescreening data that was performed by users. The selection score may be an annotated answer such as a binary rating or selection marking (i.e. a value 0 or a value 1 for selected or not selected, respectively) for a previously performed prescreening process for a publication.

The method 900 may further include a step of formulating a question based on the first set of inclusion criteria, the first set of exclusion criteria, and the data for the first publication 908. In embodiments, a different question may be formulated for each criteria category in the set of criteria categories. In some cases, only one question may be formulated based on criteria from all the criteria categories. In one example, a question may be formulated based on the set of inclusion criteria, the set of exclusion criteria, and the data for the first publication for each of the criteria categories. When inclusion and/or exclusion keywords are available, the question may include the inclusion/exclusion keyword. In embodiments, a question may be formulated based on the set of inclusion criteria, the set of exclusion criteria, the set of inclusion keywords, the set of exclusion keywords, and the data for the first publication. In embodiments, as described herein, a question may be formatted as a complete sentence or may be a pseudo-question that may not be formatted as a full sentence. The question may be formatted such that that question may have a yes or no answer.

The method 900 may further include a step of generating an input to a trained language model 910. In embodiments, each input to the trained language model may include one or more questions generated in step 908. In one example, generating an input may include adding special tokens that identify elements of the input, such as separators between sentences, special tokens to identify inclusion criteria or exclusion criteria, or special tokens to identify the context of the input. Generating an input may further include tokenizing the input using any appropriate tokenizer.

The method 900 may further include processing the set of inputs with the trained model to generate a set of probability outputs 912. The inputs may be processed by a trained language model that is fine-tuned by the method 900. The trained language model may be a transformer-based model such as a BERT model or another similar model.

The method 900 may further include the step of comparing the set of probability outputs to the selection score of the training data used to formulate the output to determine error values. The error values may be computed using any appropriate loss function such as a cross-entry loss function, margin-based loss function, and the like.

The method 900 may further include the step of updating the parameters of the language model using backpropagation 914 based on the error values computed in step 912. The backpropagation may refine the parameters of the trained language model or fine-tune the model for the specific task of answering selection questions for publications in a pre-screening process.

In embodiments, the method 900 may include generating additional negative training samples and fine-tuning the language model on the negative training samples. Negative samples may be generated from positive samples of the training data set. A positive sample from the training data set may include any sample where the inclusion/exclusion decision indicated that publication was selected. A negative sample may be generated from the positive sample by substituting the inclusion and/or exclusion criteria of the positive sample with different inclusion and/or exclusion criteria. The different inclusion and/or exclusion criteria may be selected such that it would be expected that the publication subject of the positive sample would not be selected under the different inclusion and/or exclusion criteria. A negative training sample may be generated and used to formulate an input question to the language model to further fine-tune the language model. An input based on the negative training sample may include publication data and the different inclusion and/or exclusion criteria. The negative sample may be processed by the model to determine a probability output, and the generated probability output may be compared to the non-selection of the negative sample and used to determine an error using a loss function.

A model may be fine-tuned using a plurality of sample data which may include different sets of inclusion and/or exclusion criteria.

The methods and systems described herein can provide fast and reliable prescreening. In one example, validation of the methods and systems described herein showed an accuracy=0.93, precision=0.93, recall=0.93, F1-score=0.93, and AUC=0.93 when compared to the results generated by two independent reviewers and a third verifier. The systems and methods reviewed 1000 publications in ≈12.5 minutes with no additional preparation of the datasets as compared to manual review.

It should be understood that the methods and systems described herein were described with respect to prescreening titles and abstracts of articles, they may be applied to the classification of any data using a set of inclusion and/or exclusion criteria and any set of context data. For example, the methods and systems may be used to classify or pre-screen articles based on the full text or partial text of the article and not just the abstract and/or title.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, circuits, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in their entirety.

What is claimed is:

1. A computer-implemented method for automated systematic literature review, comprising:
    obtaining a set of inclusion criteria and a set of exclusion criteria for a set of categories, the set of categories includes a population category, an intervention category, a study design category, and an outcome category;
    obtaining data for a first publication of a study from a first database;
    for each category in the set of categories, formulating a question based on the set of inclusion criteria, the set of exclusion criteria, and the data of the first publication;
    for each category in the set of categories, generating an input to a trained language model, wherein each input includes the question;
    processing the set of inputs with the trained language model to generate a set of probability outputs, wherein the trained language model is fine-tuned on a question-and-answer task;
    determining a selection score by evaluating the set of probability outputs using a scoring function;
    marking the first publication for selection based on the selection score;
    obtaining second data for a second publication of a study from a second database;
    determining if the second publication is a duplicate of the first publication; and
    in response to determining that the second publication is the duplicate of the first publication, rejecting one of the first publication or the second publication based on a hierarchy rating of the first database and the second database.

2. The method of claim 1, wherein the question has a yes or no answer.

3. The method of claim 1, wherein the data of the first publication includes a title of the first publication and an abstract of the first publication.

4. A computer-implemented method for automated systematic literature review, comprising:
- obtaining a set of inclusion criteria and a set of exclusion criteria for a set of categories, the set of categories includes a population category, an intervention category, a study design category, and an outcome category;
- obtaining data for a first publication of a study from a first database;
- generating inclusion keywords, wherein the inclusion keywords are generated based on the set of inclusion criteria;
- generating exclusion keywords, wherein the exclusion keywords are generated based on the set of exclusion criteria;
- for each category in the set of categories, formulating a question based on the set of inclusion criteria, the set of exclusion criteria, the inclusion keywords, the exclusion keywords, and the data for the first publication;
- for each category in the set of categories, generating an input to a trained language model, wherein each input includes the question;
- processing the set of inputs with the trained language model to generate a set of probability outputs, wherein the trained language model is fine-tuned on a question-and-answer task;
- determining a selection score by evaluating the set of probability outputs using a scoring function; and
- marking the first publication for selection based on the selection score.

5. The method of claim 4, further comprising:
- determining a frequency of occurrence of the inclusion keywords and the exclusion keywords in the data of the first publication; and
- ordering the inclusion keywords and the exclusion keywords based on the frequency of occurrence.

6. The method of claim 1, wherein the scoring function is based on a hierarchy of categories in the set of categories.

7. A system for automated systematic literature review, comprising:
- an input generator configured to:
  - obtain a set of inclusion criteria and a set of exclusion criteria for a set of categories, the set of categories includes a population category, an intervention category, a study design category, and an outcome category;
  - generate inclusion keywords, wherein the inclusion keywords are generated based on the set of inclusion criteria;
  - generate exclusion keywords, wherein the exclusion keywords are generated based on the set of exclusion criteria; and
  - obtain data for a first publication of a study from a first database;
- a question formulation module configured to:
  - for each category in the set of categories, formulate a question based on the set of inclusion criteria, the set of exclusion criteria, and the data of the first publication; and
  - for each category in the set of categories, generate an input, wherein each input includes the question;
- a trained language model fine-tuned on a question-and-answer task configured to:
  - process the input to generate a set of probability outputs; and
- a presentation module configured to:
  - determine a selection score by evaluating the set of probability outputs using a scoring function; and
  - mark the first publication for selection based on the selection score.

8. The system of claim 7, wherein the question has a yes or no answer.

9. The system of claim 7, wherein the data of the first publication includes a title of the first publication and an abstract of the first publication.

10. The system of claim 7, wherein the input generator is further configured to:
- determine a frequency of occurrence of the inclusion keywords and the exclusion keywords in the data of the first publication; and
- order the inclusion keywords and the exclusion keywords based on the frequency of occurrence.

11. The system of claim 7, wherein the scoring function is based on a hierarchy of categories in the set of categories.

12. One or more non-transitory, computer-readable media comprising computer-executable instructions that, when executed, cause at least one processor to perform actions comprising:
- obtaining a set of inclusion criteria and a set of exclusion criteria for a set of categories, the set of categories includes a population category, an intervention category, a study design category, and an outcome category;
- obtaining data for a first publication of a study from a first database;
- for each category in the set of categories, formulating a question based on the set of inclusion criteria, the set of exclusion criteria, and the data of the first publication;
- for each category in the set of categories, generating an input to a trained language model, wherein each input includes the question;
- processing the set of inputs with the trained language model to generate a set of probability outputs, wherein the trained language model is fine-tuned on a question-and-answer task;
- determining a selection score by evaluating the set of probability outputs using a scoring function;
- marking the first publication for selection based on the selection score;
- obtaining second data for a second publication of a study from a second database;
- determining if the second publication is a duplicate of the first publication; and
- in response to determining that the second publication is the duplicate of the first publication, rejecting one of the first publication or the second publication based on a hierarchy rating of the first database and the second database.

13. The one or more non-transitory, computer-readable media of claim 12, wherein the question has a yes or no answer.

14. The one or more non-transitory, computer-readable media of claim 12, wherein the data of the first publication includes a title of the first publication and an abstract of the first publication.

15. One or more non-transitory, computer-readable media comprising computer-executable instructions that, when executed, cause at least one processor to perform actions comprising:

obtaining a set of inclusion criteria and a set of exclusion criteria for a set of categories, the set of categories includes a population category, an intervention category, a study design category, and an outcome category;

generating inclusion keywords, wherein the inclusion keywords are generated based on the set of inclusion criteria;

generating exclusion keywords, wherein the exclusion keywords are generated based on the set of exclusion criteria;

obtaining data for a first publication of a study from a first database;

for each category in the set of categories, formulating a question based on the set of inclusion criteria, the set of exclusion criteria, the inclusion keywords, the exclusion keywords, and the data for the first publication;

for each category in the set of categories, generating an input to a trained language model, wherein each input includes the question;

processing the set of inputs with the trained language model to generate a set of probability outputs, wherein the trained language model is fine-tuned on a question-and-answer task;

determining a selection score by evaluating the set of probability outputs using a scoring function; and marking the first publication for selection based on the selection score.

16. The one or more non-transitory, computer-readable media of claim 15, further comprising instructions that cause at least one processor to perform actions comprising:

determining a frequency of occurrence of the inclusion keywords and the exclusion keywords in the data of the first publication; and ordering the inclusion keywords and the exclusion keywords based on the frequency of occurrence.

17. The one or more non-transitory, computer-readable media of claim 12, wherein the scoring function is based on a hierarchy of categories in the set of categories.

* * * * *